United States Patent
Halonen et al.

(10) Patent No.: US 11,667,248 B2
(45) Date of Patent: Jun. 6, 2023

(54) VEHICLE MOUNTING SYSTEM

(71) Applicant: Havis, Inc., Warminster, PA (US)

(72) Inventors: Keith Halonen, Howell, MI (US); Stephen Telesco, Dexter, MI (US)

(73) Assignee: Havis, Inc., Warminster, PA (US)

( * ) Notice: Subject to any disclaimer, the term of this patent is extended or adjusted under 35 U.S.C. 154(b) by 223 days.

(21) Appl. No.: 17/146,543

(22) Filed: Jan. 12, 2021

(65) Prior Publication Data
US 2022/0219616 A1  Jul. 14, 2022

(51) Int. Cl.
B60R 11/00  (2006.01)

(52) U.S. Cl.
CPC ....... B60R 11/00 (2013.01); *B60R 2011/0003* (2013.01); *B60R 2011/0089* (2013.01)

(58) Field of Classification Search
CPC ............ B60R 11/00; B60R 2011/0003; B60R 2011/0089
See application file for complete search history.

(56) References Cited

U.S. PATENT DOCUMENTS

| | | |
|---|---|---|
| 2,752,116 A | 6/1956 | Minnis |
| 4,620,813 A | 11/1986 | Lacher et al. |
| 5,845,885 A | 12/1998 | Carnevali |
| 6,158,793 A | 12/2000 | Castro |
| 6,561,476 B2 | 5/2003 | Carnevali |
| 6,581,892 B2 | 6/2003 | Carnevali |
| 7,090,181 B2 | 8/2006 | Biba et al. |
| RE42,060 E | 1/2011 | Carnevali |
| RE42,581 E | 8/2011 | Carnevali |
| 7,993,069 B2 * | 8/2011 | Persson ................. F16M 13/00 403/56 |
| 8,186,636 B2 | 5/2012 | Carnevali |
| RE43,806 E | 11/2012 | Carnevali |
| 8,454,178 B2 | 6/2013 | Carnevali |
| 8,534,951 B2 | 9/2013 | Komine et al. |
| 8,590,855 B2 | 11/2013 | Carnevali |
| 2008/0061197 A1 | 3/2008 | Carnevali |
| 2009/0136290 A1 * | 5/2009 | Persson ................. F16M 11/14 403/125 |
| 2016/0368429 A1 * | 12/2016 | Bernert ................. B60R 11/02 |
| 2019/0241129 A1 * | 8/2019 | Song ................. B60R 11/0241 |

OTHER PUBLICATIONS

Entire patent prosecution history of U.S. Appl. No. 14/745,839, filed Jun. 22, 2015, entitled, "Vehicle Mounting System."

* cited by examiner

*Primary Examiner* — Anita M King
(74) *Attorney, Agent, or Firm* — RatnerPrestia (57) ABSTRACT

A system for mounting an object within a vehicle. The system has a housing, a pair of rotatable objects at least partially received within a respective opposed end of the housing, a pair of locking elements within the housing and movable between a locked position in which they exert a locking force against a respective rotatable object, and an unlocked position in which the locking element does not exert the locking force against the respective rotatable object. A handle extends from the housing and is coupled to the locking elements through a rigid linkage within the housing. The handle is pivotable between an extended position in which the handle moves the pair of locking elements via the rigid linkage to the unlocked position and a locked position in which the handle moves the pair of locking elements via the rigid linkage to the locked position.

19 Claims, 7 Drawing Sheets

VEHICLE MOUNTING SYSTEM

FIELD OF THE INVENTION

The present invention relates generally to mounting systems, and more particularly, to systems for repositionably mounting objects within a moving vehicle.

BACKGROUND OF THE INVENTION

Specialized vehicles are an essential tool in many different professions. For example, professions such as law enforcement commonly utilize a number of specialized electronic systems (e.g., computers, radio systems, sirens) that are not found in conventional automobiles. Other professions and enterprises also commonly have a need to use vehicles with similar specialized equipment. For example, customized electronics systems are frequently installed in vehicles such as forklifts, waste collection trucks, utility trucks, construction equipment and agricultural equipment. While vehicles may be specially manufactured that include these systems, these systems may also be added to conventional automobiles or other vehicles through after-market installations. However, one problem that arises from such installations is the simple and effective mounting of after-market electronic devices in conventional vehicles. Improved systems are desired for repositionably mounting objects in vehicles.

SUMMARY OF THE INVENTION

Aspects of the present invention are directed to systems for mounting an object within a vehicle.

In accordance with one exemplary aspect, there is provided a system for mounting an object within a vehicle, the system having: a housing having opposed ends; a pair of rotatable objects, each rotatable object at least partially received within a respective one of the opposed ends of the housing; a pair of locking elements positioned within the housing, each locking element movable within the housing between a locked position in which the locking element exerts a locking force against a respective rotatable object to resist rotation of the rotatable object relative to the housing, and an unlocked position in which the locking element does not exert the locking force against the respective rotatable object, and the rotatable object is free to rotate relative to the housing; and a handle extending from the housing, the handle being coupled to the pair of locking elements through a rigid linkage positioned at least partially within the housing, the handle pivotable between an extended position in which the handle moves the pair of locking elements via the rigid linkage to the unlocked position and a locked position in which the handle moves the pair of locking elements via the rigid linkage to the locked position.

In some exemplary aspects, the pair of rotatable objects are a pair of balls, each ball having a mating structure extending therefrom, the respective mating structure of each ball configured to be attached to the vehicle or the object.

In some exemplary aspects, each ball is formed from an elastomeric material overmolded over a portion of a stem that defines at least part of the mating structure, wherein at least one cross post extends through the portion of the stem, and the elastomeric material forming the ball is overmolded over the at least one cross post and the portion of the stem.

In some exemplary aspects, each ball is formed from an elastomeric material overmolded over a portion of a stem that defines at least part of the mating structure, wherein the stem comprises at least one radially extending plate, wherein the elastomeric material forming the ball is overmolded over the at least one plate and the portion of the stem.

In some exemplary aspects, each ball is formed from an elastomeric material overmolded over a portion of a stem that defines at least part of the mating structure, wherein the portion of the stem comprises at least one recess, and the elastomeric material forming the ball is overmolded over the portion of the stem and extends into the at least one recess.

In some exemplary embodiments, the portion of the stem that defines at least part of the mating structure comprises a spherical cage having a plurality of cutouts.

In some exemplary aspects, each of the pair of locking elements comprises a respective sleeves that is configured to slide within a corresponding bore in the housing.

In some exemplary aspects, each of the pair of locking elements comprises a partially spherical locking surface positioned to press against the respective rotatable object when the locking element is in the locked position.

In some exemplary aspects, at least one of the partially spherical locking surface and a surface of the rotatable object comprises a compressible elastomeric material.

In some exemplary aspects, each partially spherical locking surface comprises one or more ribs extending towards a respective rotatable object, or one or more grooves extending away from the respective rotatable object.

In some exemplary aspects, the rigid linkage is configured such that movement of the handle from the extended position toward the locked position increases a force applied to the pair of rotatable objects by the pair of locking elements, and movement of the handle from the locked position toward the extended position decreases a force applied to the pair of rotatable objects by the pair of locking elements.

In some exemplary aspects, the handle is pivotally connected to the housing at a handle pivot.

In some exemplary aspects, the rigid linkage comprises: a drive link having a first end coupled to the handle at a first location offset from the handle pivot and a second end extending from the handle into the housing; and a pair of driven links coupled at respective first ends to the drive link and coupled at respective second ends to a respective one of the pair of locking elements.

In some exemplary aspects, the drive link is rotatably connected to the handle at the first location by a first pivot; each of the pair of driven links is coupled at the respective first end to the second end of the drive link at a respective second pivot; and each of the pair of driven links is coupled at the respective second end to the respective one of the pair of locking elements at a respective third pivot.

In some exemplary aspects, the respective lower drive link pivots are offset from each other.

In some exemplary aspects, when the handle is in the extended position, at least one of the respective second pivots is located on a first side of a drive axis defined by a straight line extending between the third pivots, and when the handle is in the locked position the at least one of the respective second pivots is located on a second side of the drive axis.

In some exemplary aspects, when the handle is in the extended position, the second pivots are located on a first side of a drive axis defined by a straight line extending between the third pivots, and when the handle is in the locked position the second pivots are located on a second side of the drive axis.

In some exemplary aspects, the rigid linkage is movable to a self-retaining locked position.

In some exemplary aspects, at least one of the pair of rotatable objects comprises a ball fixed to a stem, and a mating structure releasably secured to the stem.

In some exemplary aspects, at least one of the pair of rotatable objects comprises a ball configured to be secured to a plurality of different mating structures.

In some exemplary aspects, the ball is secured to a stem having a first connection interface, and each of the plurality of different mating structures comprises a respective second connection interface configured to mate with the first connection interface, and each of the plurality of different mating structures comprises a respective base extending from the respective second connection interface, with each respective base having a unique geometrical shape.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

The systems disclosed herein are usable to provide mounting for objects within conventional vehicles (such as automobiles). While the disclosed systems are described herein with respect to mounting within the cabin of a vehicle, it will be understood that the invention is not so limited. To the contrary, aspects of the present invention are usable in any application in which a repositionable mount is desired.

While any objects may be mounted within the disclosed systems, the disclosed mounting systems are particularly suitable for mounting electronic devices, such as laptops, tablets, or mobile phones. Such devices may be subject to periodic use within the vehicle, and as such, the disclosed systems advantageously allow such objects be repositioned between a "use" and "stow" position while remaining mounted to a portion of the vehicle. Other electronic devices or objects mountable with the disclosed systems will be known to those of ordinary skill in the art from the description herein.

Figure 1:
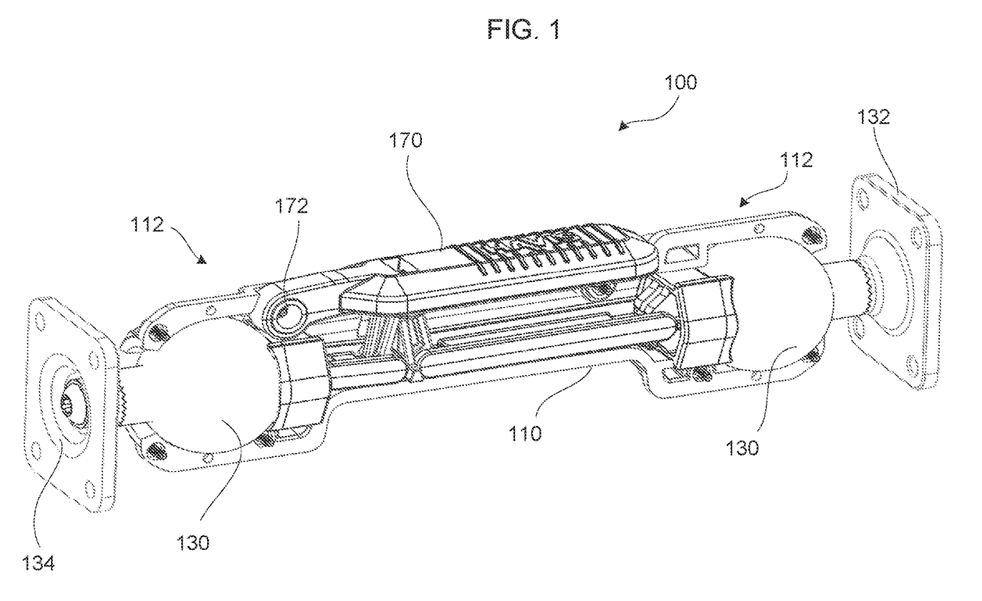
FIG. 1 is a perspective view of an exemplary system for mounting an object within a vehicle in accordance with aspects of the present invention.

With reference to the drawings, FIG. 1 illustrates an exemplary system 100 for mounting an object within a vehicle in accordance with aspects of the present invention. System 100 is usable to repositionably mount objects, such that they can be moved within various stable positions within a vehicle. In general, system 100 includes a housing 110, a pair of rotatable objects 130, a pair of locking elements 150, and a handle 170. Additional details of system 100 are provided herein.

Housing 110 houses the components of system 100. Housing 110 has a pair of opposed ends 112 on either side of an elongated body. The elongated shape of housing 110 provides distance between the mounting surface and the object to be mounted. When installed, one end 112 of housing 110 is positioned adjacent the mounting surface, and the other end 112 of housing 110 is positioned adjacent the object being mounted.

Figure 2:
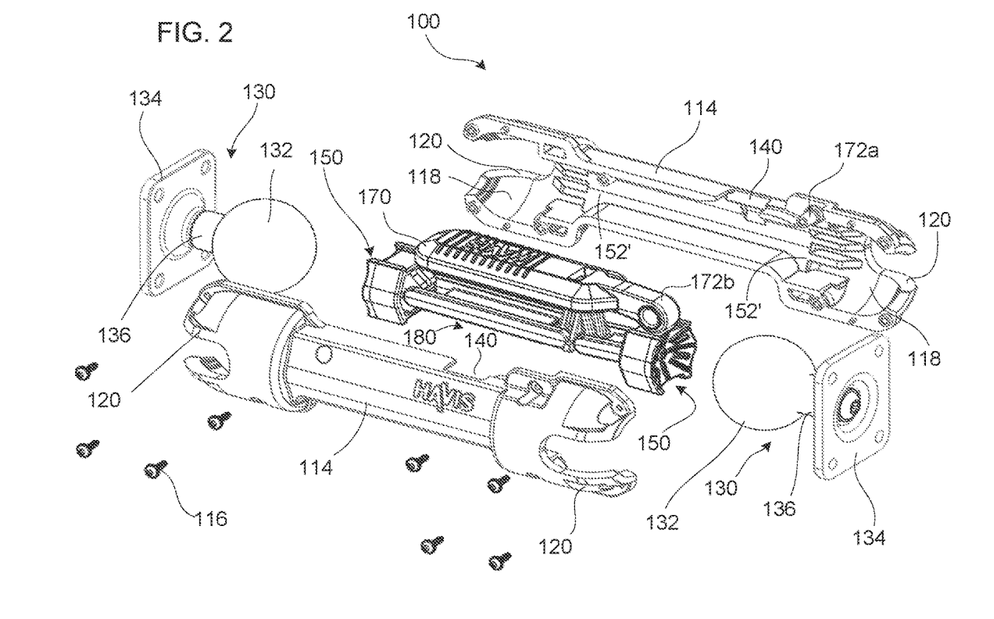
FIG. 2 is an exploded perspective view of the system of FIG. 1.

In an exemplary embodiment, housing 110 has a hollow tubular shape, and may include features such as ribs to enhance rigidity and ergonomic shapes or grips to enhance ease of use. For example, as shown in FIG. 1, the side of the housing opposite the handle 170 may be arched to reduce the overall size and help users grasp the housing 110. As shown in FIG. 2, the housing 110 comprises a pair of hemicylindrical housing shells 114 which are mated to one another to form housing 110. Housing shells 114 may be mated to one another, for example, by screws, bolts, adhesives, ultrasonic welding, friction fitting and so on. In an exemplary embodiment, one of the housing shells 114 includes a plurality of screws 116 for attaching to the other housing shell 114, as shown in FIG. 2. One or both of the housing shells 114 may include one or more openings, such as corresponding cutouts 140, for accommodating handle 170.

Each end 112 of housing 110 includes a partially spherical surface 118 therein. A portion of each partially spherical surface 118 is formed by each housing shell 114, such that when housing 110 is assembled, the partially spherical surfaces 118 provide a partially spherical concave space within housing 110. Each rotatable object 130 is dimensioned to fit inside each partially spherical concave space, with a portion of the rotatable object 130 extending outside housing 110 via a respective opening defined at its outer perimeter by a respective perimeter wall 120. Each rotatable object 130 and perimeter wall 120 is dimensioned to allow the rotatable object 130 to move relative to housing 110 throughout a range of travel, such as shown by the arrows in FIG. 1.

In an exemplary embodiment, each rotatable object 130 has a spherical portion 132, which is referred to herein as a ball. Each rotatable object 130 has a mating structure that is configured to be attached to either the mounting surface of the vehicle or the object to be mounted. Non-limiting examples of mating structures include threaded rods or screws, apertures to receive bolts, pins or rivets, keyed projections sized to mate with corresponding apertures on the mounting surface or mounted object, and so on. The mating structure also may be internal to the ball portion 132 of rotatable object 130. For example, the mounting structure may be formed as openings in rotatable objects 130, into which a corresponding projection on either the mating surface or mounted object can be inserted. It will also be understood that system 100 may include one or more additional components (not shown) for attaching the mating structures to either the mounting surface or the mounted object.

In the shown example, the mating structure comprises a base 134 having screw holes or the like, and a stem 136 connecting the base 134 to the ball portion 132 of the rotatable object 130. Stem 136 is dimensioned to fit within perimeter wall 120 with room to move in one or more directions to provide the desired range of motion.

Handle 170 extends from housing 110 and may be rotationally coupled to housing 110 by a handle pivot 172. As used herein the term "pivot" includes any rotational connection, such as a pin that fits into a bore, and the location of a pivot is defined by the axis of rotation provided by the rotational connection. Handle pivot 172 may comprise, for example, a pin 172a extending from one or both housing shells 114 to extend into a correspondingly-sized bore 172b through handle 170.

Figure 4A:
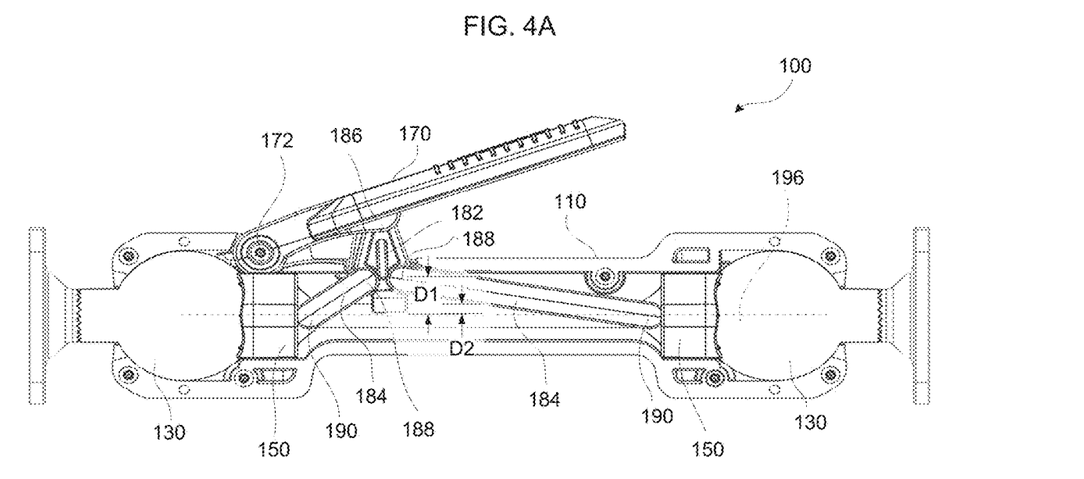
FIGS. 4A and 4B are cutaway side views of the system of FIG. 1, shown in the unlocked and locked positions, respectively.
Figure 4B:
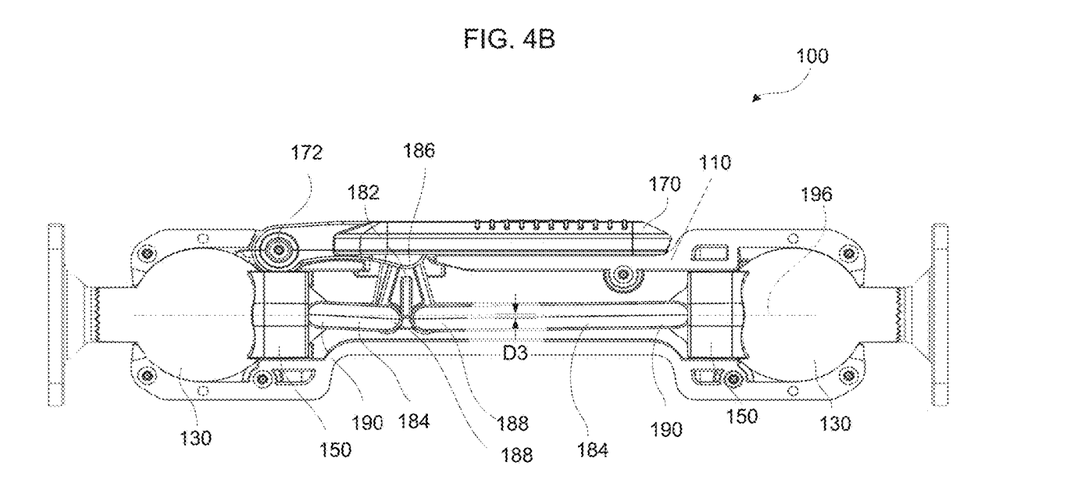
Figure 5A:
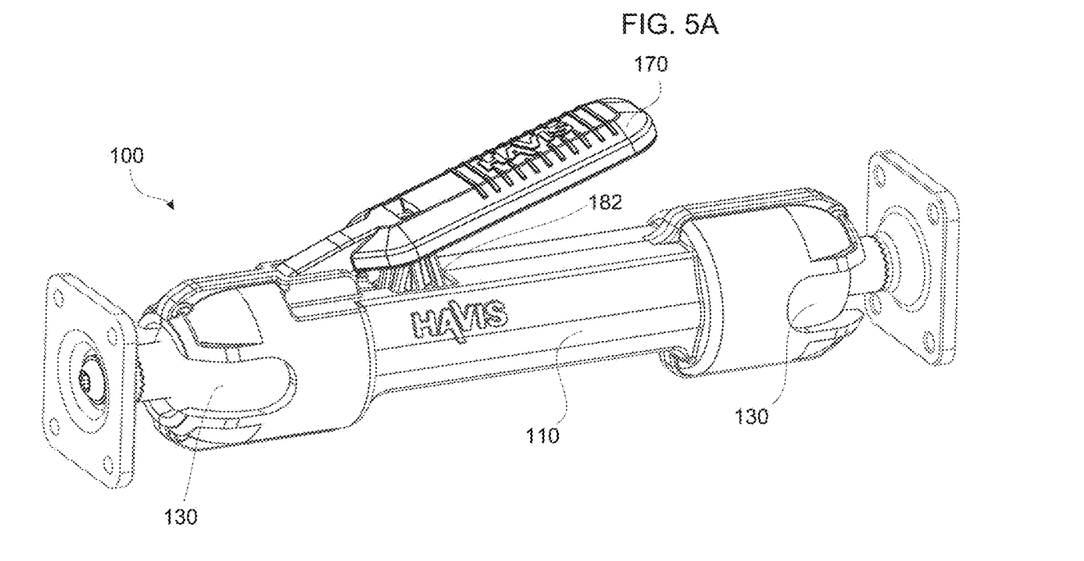
FIGS. 5A and 5B are perspective views of the system of FIG. 1, shown in the unlocked and locked positions, respectively.
Figure 5B:
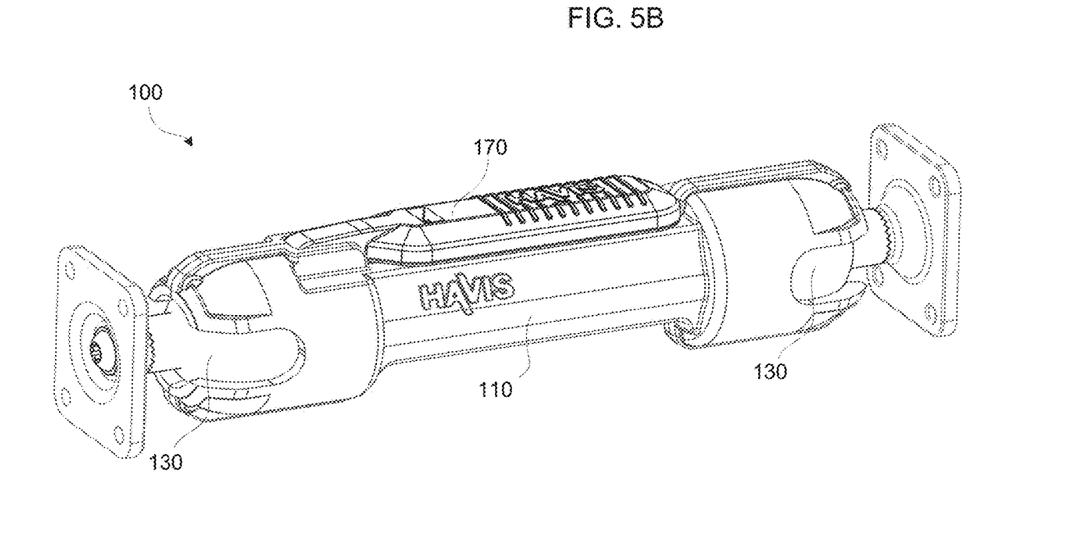

Handle 170 is movable relative to housing 110 between an unlocked position (see, e.g., FIGS. 4A and 5A) and a locked position (see, e.g., FIGS. 1, 4B and 5B). In the unlocked position, handle 170 may protrude from housing 110, and in the locked position handle 170 may lie along or be flush with housing 110, such as shown in FIG. 1. However, neither of these configurations is strictly necessary in all embodiments.

System 100 also includes a pair of locking elements 150 positioned within housing 110. Each locking element 150 is movable within housing 110 between a locked position in which the locking element 150 exerts a locking force against a respective rotatable object 130 to resist rotation of the rotatable object 130 relative to the housing 110, and an unlocked position in which the locking element 150 does not exert the locking force (or exerts less force) against the respective rotatable object 130, thus freeing the rotatable object 130 is to rotate relative to housing 110.

Figure 3A:
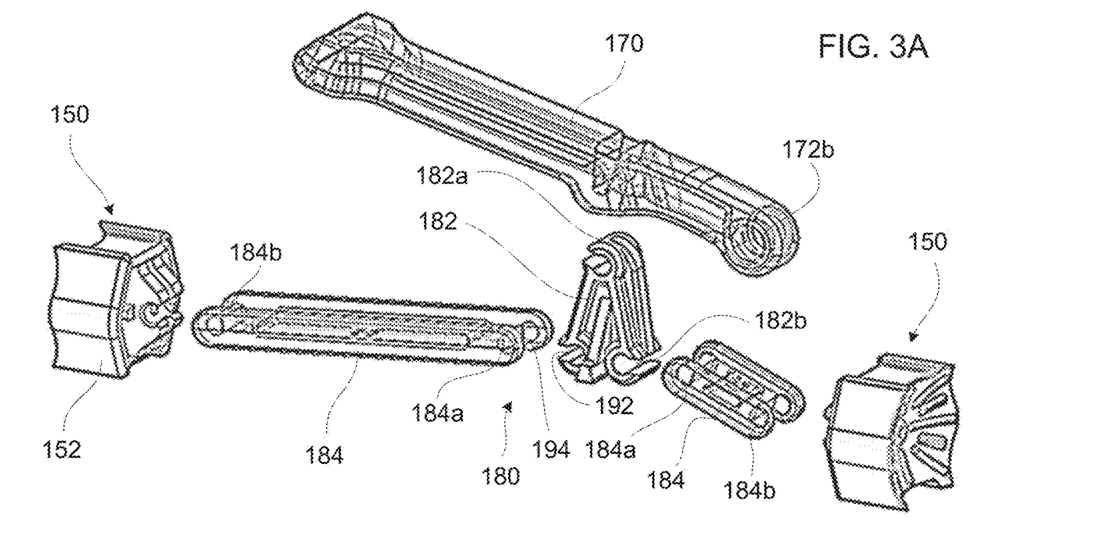
FIGS. 3A and 3B are assembled and exploded views, respectively, of portions of the system of FIG. 1.
Figure 3B:
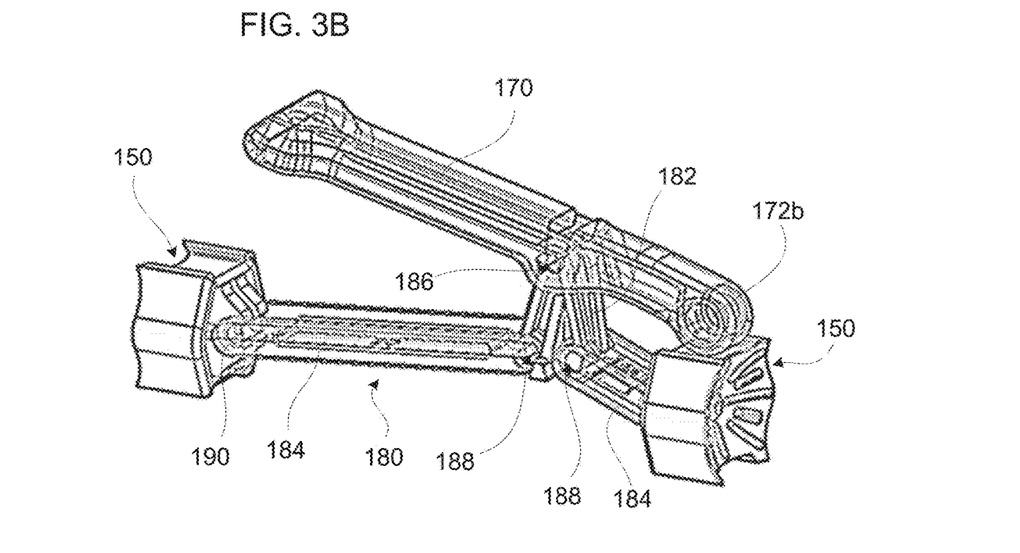

Movement of the locking elements 150 is controlled by handle 170 by way of a rigid linkage 180, an example of which is shown in more detail in FIGS. 3A and 3B. Exemplary rigid linkage 180 includes a drive link 182 and a pair of driven links 184. Drive link 182 is coupled to handle 170, and driven links 184 are coupled between drive link 182 and respective ones of the locking elements 150. For example, in the shown embodiment, drive link 182 is coupled at a first end 182a to handle 170 by a first pivot 186, and extends to a second end 182b where it is coupled to the driven links 184 at respective second pivots 188. Second pivots 188 are shown in the example as being spaced from each other (i.e., their respective pivot axes are not collinear), but other embodiments may have collinear second pivots 188, and such collinear second pivots 188 may share a common pivot pin, bore, or other features.

Each driven link 184 extends from a respective first end 184a at the respective second pivot 188, to a respective second end 184b where it is coupled to the respective locking element 150 by a respective third pivot 190. Each of the first, second and third pivots 186, 188, 190 may be constructed using any suitable rotating connection. In the shown example, each pivot is formed by a C-shaped receptacle 192 into which a pin 194 is snap-fit. This allows simple and rapid assembly and servicing. In other cases, pins, screws, or other mechanisms may be used to rotationally secure the parts. The pivots 186, 188, 190 also may be formed by flexible webs of material (i.e., so-called living hinges), in which case one or more of handle 170, drive link 182 and driven links 184 may be integrally formed (e.g., injection molded as a single continuous part).

Operation of system 100 is illustrated in FIGS. 4A and 5A, which show the system 100 in an unlocked position, and FIGS. 4B and 5B, which show system 100 in a locked position. In the unlocked position, handle 170 is oriented about handle pivot 172 to protrude from housing 110. Some or all of drive link 182 may protrude from housing 110 in this position, but this is not required in all examples. In this position, drive link 182 and driven links 184 are positioned with second pivots 188 offset by respective first distances D1 on one side of a drive axis 196 (i.e., an imaginary straight line) extending between the third pivots 190.

Starting from the unlocked position, handle 170 can be rotated about handle pivot 172 towards housing 110. During such rotation, handle 170 moves drive link 182 and second pivots 188 towards drive axis 196. As second pivots 188 move towards drive axis 196, driven links 184 cause locking elements 150 to slide away from each other along drive axis 196. Locking elements 150 eventually move far enough to press against rotatable objects 130 with sufficient force to hold rotatable objects 130 in place against normal service loads. At this point, second pivots 188 are spaced from drive axis 196 by a second distance D2 that is less than first distance D1, and the system 100 has reached a locked position.

Optionally, but not necessarily, the rigid linkage 180 may be configured to move into a self-retaining locked position, such as shown in FIG. 4B. Specifically, one or both second pivots 188 may move far enough to pass across to an opposite side of drive axis 196 by a third distance D3, at which point further movement is prevented by a travel stop (e.g., contact between handle 170 and housing 110). Third distance D3 is less than or equal to second distance D2. Thus, locking elements 150 are positioned along drive axis 196 where they clamp the rotatable objects 130 against movement. To remove rigid linkage 180 from the self-retaining locked position, it is necessary to move second pivots 188 across drive axis 196, which requires a slight movement of locking elements 150 away from each other. Thus, absent any external force being applied to lever 170, the lever 170 and rigid linkage 180 will remain in the self-retaining locked position.

When it is desired to unlock the rotatable objects 130, handle 170 is moved back to the unlocked position. This movement pulls drive link 182, and thus second pivots 188, away from drive axis 196, which causes driven links 184 to pull locking elements 150 towards each other. When the parts have reached the unlocked position, locking elements 150 are positioned to permit adjustment of the positions of rotatable objects 130. In this state, locking elements 150 may be completely out of contact with rotatable objects 130, but more preferably are in light contact to provide a force sufficient to hold the rotatable objects 130 against movement until a user applies an external force to make adjustments. The selection of suitable forces for locking and unlocking rotatable objects 130 will be understood by one of skill in the art from the description herein.

Rigid linkage 180 preferably does not include elements that are intended to significantly deform during use, such as mechanical or pneumatic springs or the like. Thus, except for slight deformation of the parts that might (but does not necessarily) occur during the transition to and from a self-retaining over-center position, movement of handle 170 leads to a proportional change in position of the components of rigid linkage 180 regardless of loading. However, locking elements 150 and/or rotatable objects 130 may include elastic features, such as overmolded elastomeric layers or the like. Examples of such features are discussed below.

Figure 6:
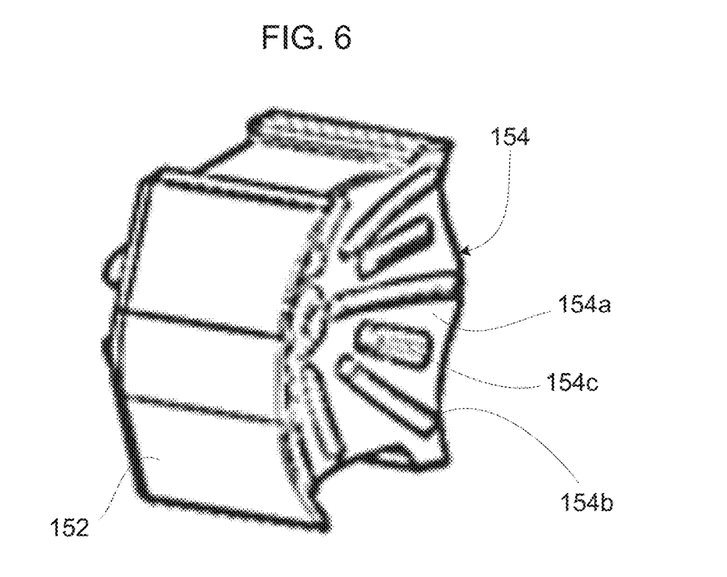
FIG. 6 is a perspective view of an exemplary locking element of FIG. 1.

Referring to FIG. 6, each locking element 150 may comprise a sleeve 152 having a partially spherical locking surface 154. Sleeves 152 are dimensioned to slide within corresponding bores formed in the hollow housing 110, and are movable along drive axis 196 between the locked and unlocked positions. To this end, each sleeve 152 may comprise a profile having an outer wall that extends parallel to drive axis 196, and the outer wall may be shaped with a non-circular profile to counteract any rotational torques that might be applied by contact with rotatable objects 130. For example, the shown sleeves 152 have a six-sided rectilinear perimeter profile that matches a corresponding six-sided rectilinear bores 152' (FIG. 2) formed within housing 110.

Each partially spherical locking surface 154 faces and contacts a respective rotatable object 130. Partially spherical locking surface 154 may be formed as continuous surface (e.g., a single surface having a radius of curvature about a central point), or it may be formed by plural surfaces (e.g., multiple surfaces that are not connected but are all have a radius of curvature about a common point). Partially spherical locking surface 154 also may be formed by a collection of shapes that effectively form a partially spherical surface, such as an assembly of pins that terminate at points that are located equidistantly from a spherical center, or an assembly of flat facets that are tangential to a common spherical center.

In a preferred embodiment, either the partially spherical locking surfaces 154 or outer surfaces of the rotatable objects 130 is covered with or has regions of a compressible material. The compressible material may be a compressible rubber material, and elastomeric polymer, or other material adapted to create friction between locking element 150 and rotatable object 130. The friction between these objects prevents rotation of rotatable object 130 relative to housing 110, and immobilizes the mounted object in the desired position. Similarly, the partially spherical surfaces 118 of housing 110 also may include compressible friction-generating materials.

In the shown example, each rotatable object 130 is covered with a compressible material. Each partially spherical locking surface 154 comprises a main surface 154a that is curved about a single spherical center point, one or more raised ribs 154b that protrude from main surface 154a towards the spherical center point, and one or more grooves 154c that protrude away from main surface 154a away from the spherical center point. Ribs 154b form a primary point of contact between locking element 150 and rotatable object 130, and main surface 154a may also contact rotatable object 130 upon application of sufficient force to press ribs 154b deeply enough into the compressible material. Grooves 154c are regions in which locking element 130 does not contact rotatable object 130, but the compressible material may extrude into grooves 154c upon application of sufficient locking force. Thus, ribs 154b and grooves 154c enhance the locking force against rotatable object 130 by creating mechanical interference against rotation.

Referring now to FIGS. 7-11, various exemplary embodiments of rotatable objects 130 are described. In each case, the rotatable object 130 has a ball 132, base 134 and stem 136.

Figure 7:
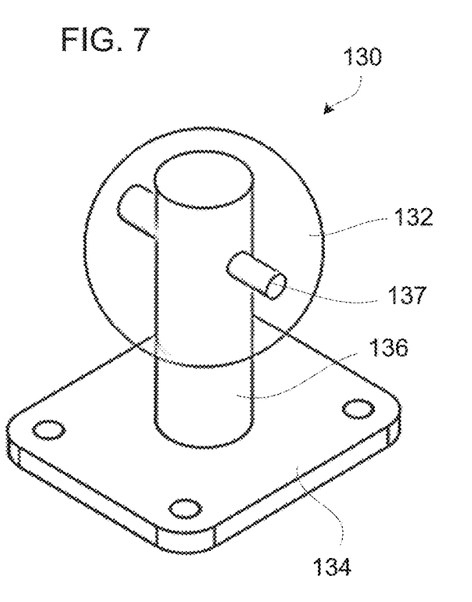
FIG. 7 is a perspective view of an exemplary rotatable object of FIG. 1.
Figure 8:
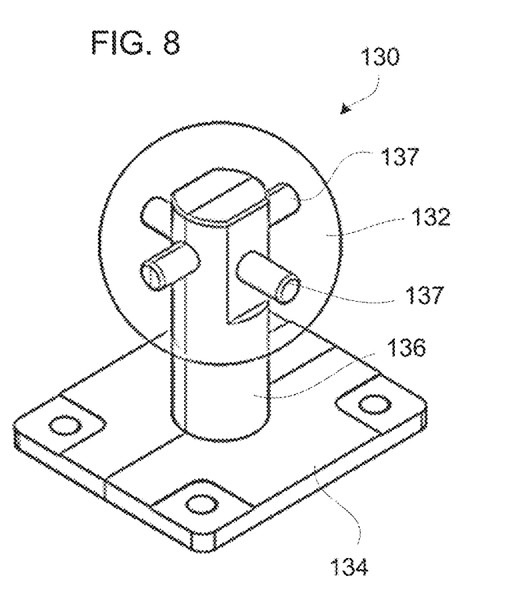
FIG. 8 is a perspective view of another exemplary rotatable object of FIG. 1.

In FIGS. 7 and 8, base 134 and stem 136 are formed as a unitary plastic or metal part, such as by injection molding or casting, and ball 132 is formed by an elastomeric material that is overmolded onto the preformed base 134 and stem 136. In FIG. 7, stem 136 includes a single cross post 137 that extends perpendicular to stem 136, and in FIG. 8, stem 136 includes two cross posts 137 that extend perpendicular to stem 136. Other embodiments may use other numbers or orientations of cross posts 137, and one or more cross posts 137 may extend from only one side of stem 136.

Figure 9:
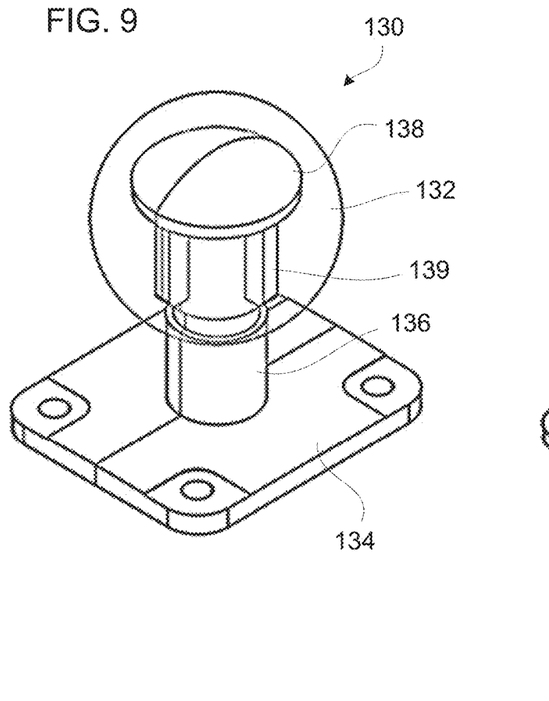
FIG. 9 is a perspective view of another exemplary rotatable object of FIG. 1.
Figure 10:
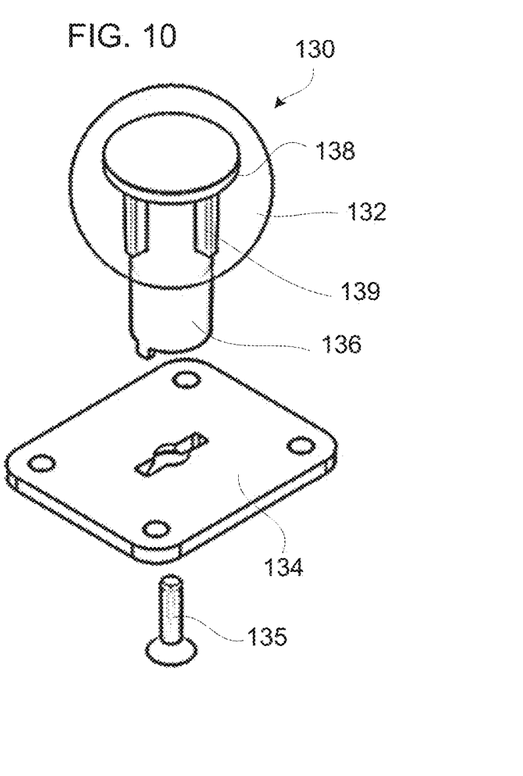
FIG. 10 is a perspective view of another exemplary rotatable object of FIG. 1.

In FIGS. 9 and 10, stem 136 includes a plate 138 that extends radially from stem 136. In these example, plate 138 is curved to form a semi-spherical surface at the top of stem 136. In other cases, plate 138 may be flat, conical, or have other shapes. Plate 138 also may be located along the length of stem 136, rather than being at the end. Stem 136 also may include axial ribs 139 that extend from stem 136 to buttress the bottom of plate 138. In these examples, ball 132 is overmolded over the preformed stem 136. In FIG. 9, stem 136 is integrally formed with base 134, whereas in FIG. 10, stem 136 is formed separately from base 134, and attached to base 134 by a fastener such as a screw.

Figure 11:
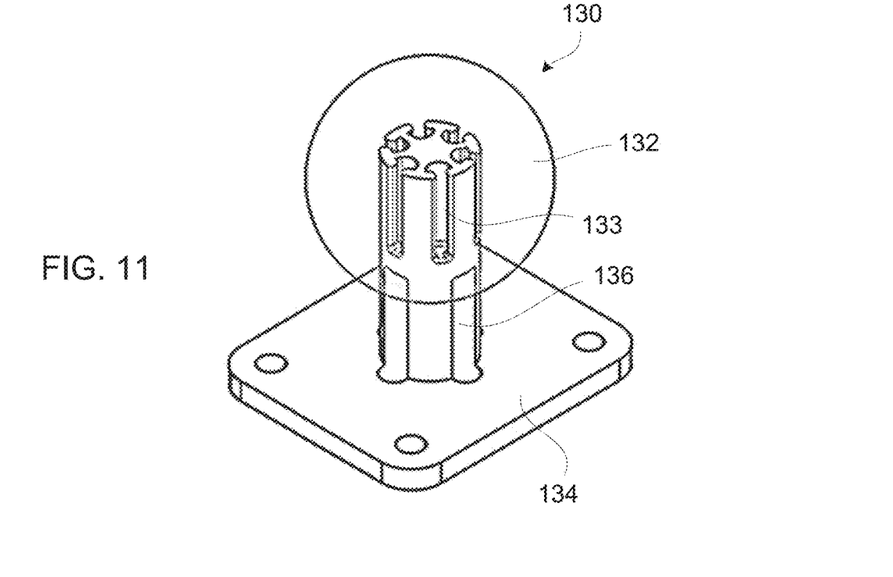
FIG. 11 is a perspective view of another exemplary rotatable object of FIG. 1.

FIG. 11 shows a rotatable object 130 having ball 132 overmolded onto stem 136 having one or more recesses 133 formed therein, such that the material forming ball 132 permeates the recesses 133. The exemplary recesses 133 comprise bores that extend axially along stem 136, but other shapes may be used.

Figures 12A, 12B:
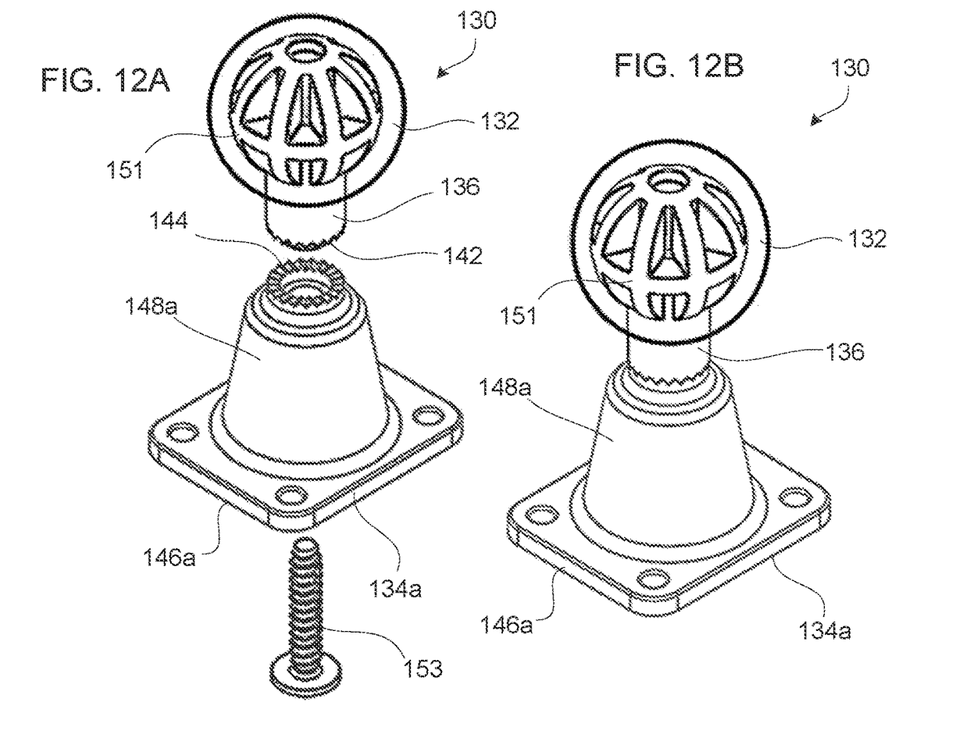
FIGS. 12A and 12B are exploded and assembled perspective views, respectively, of another exemplary rotatable object of FIG. 1.
Figures 13A, 13B:
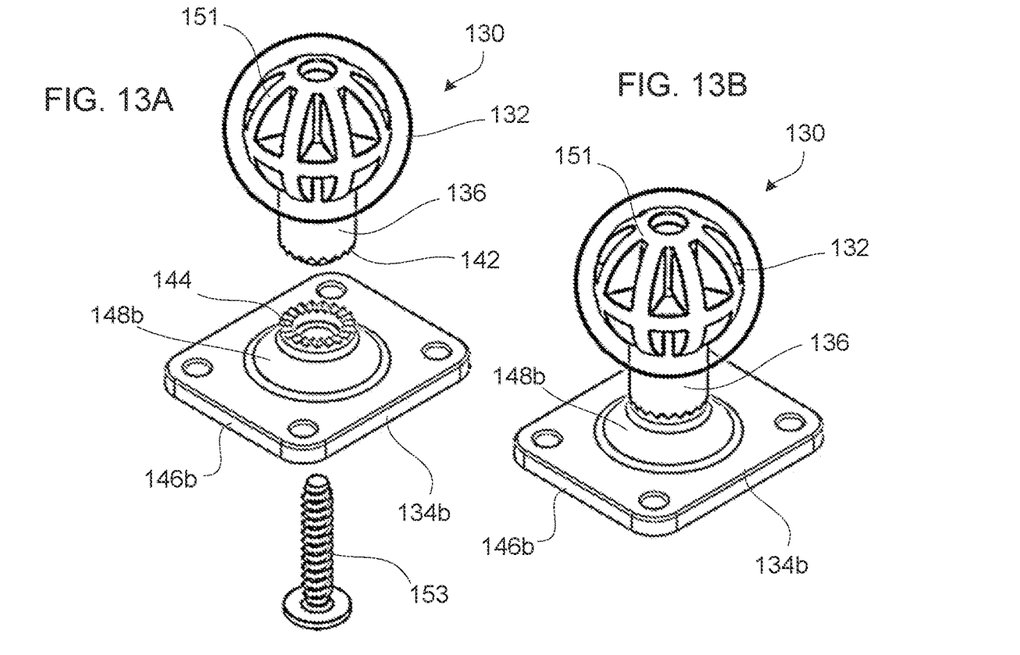
FIGS. 13A and 13B are exploded and assembled perspective views, respectively, of another exemplary rotatable object of FIG. 1.

FIGS. 12A through 13B show additional embodiments of a rotatable object 130. Here, the rotatable object 130 also includes a ball 132 overmolded onto a stem 136, and the stem 136 is selectively connectable to multiple different bases 134. A first base 134a is shown in FIGS. 12A and 12B, and a second base 134b is shown in FIGS. 13A and 13B. The end of the stem 136 opposite the ball 132 includes a first connection interface 142, and each base 134a, 134b includes a corresponding second connection interface 144. The connection interfaces 142, 144 may engage each other to hold the stem 136 at a fixed position on the base 134a, 134b. For example, the connection interfaces 142, 144 may have matching teeth or crenellations that engage to prevent rotation relative to each other. Alternatively, the connection interfaces 142, 144 may include sliding surfaces to allow free relative rotation between the parts. The stem 136 is selectively secured to either the first base 134a or the second base 134b by a fastener 153, such as a screw, which pulls the connection interfaces 142, 144 together to form a secure fit. It is preferred that the connection interfaces 142, 144 do not allow any relative movement between the base 134a, 134b and the stem 136 when the fastener 153 is fully secured, but this is not strictly required.

The geometry of the first base 134a differs from the geometry of the second base 134b in one or more ways to accommodate different installation requirements or user preferences. For example, the second base 134b may have a shorter height than the first base 134a, such as shown in the illustrated example. More specifically, each base 134a, 134b includes a respective fixation member 146a (e.g., a mounting plate having holes for fasteners), 146b, and a respective mounting post 148a, 148b upon which the respective connection interface 144 is positioned. The mounting post 148b of the second base 134b is shorter than the mounting post 148a of the first base 134a, such that its connection interface 144 is located closer to the fixation member 146b. In other cases, the bases 134a, 134b may be configured with the respective connection interfaces 144 at different angles relative to the fixation member 146a, 146b. In still other cases, the fixation members 146a, 146b may have different geometries (e.g., a flat plate for the first fixation member 146a, and a curved plate for the second fixation member 146b). Other alternatives and variations will be apparent to persons of ordinary skill in the art in view of the present disclosure.

The rotatable objects 130 of FIGS. 12A-13B also show a further variation of the stem geometry to secured the ball 132 to the stem 136. In this example, the stem 136 terminates at a cage 151 comprising an outer peripheral surface having a plurality of openings. In this case, the cage's outer peripheral surface is generally spherical, and the openings are configured as triangular cutouts. In this case, each cutout is a distinct volumetric space that does not intersect the other cutouts, but in other cases the cutouts may intersect each other to form continuous passages through the cage 151. The ball 132 may be overmolded onto the cage 151, such that material flows into the cage openings to provide a more secure fitment of the ball 132 to the stem 136.

Embodiments such as those shown in FIGS. 12A through 13B may be provided separately (e.g., with only one of two bases 134a, 134b), of as kits having multiple different bases 134a, 134b.

In any of the foregoing embodiments, interaction between the overmolded ball 132 and protruding or recessed structures on stem 136 are expected to enhance retention of the overmolded material. Combinations of protrusions and recesses also may be used, and other alternatives and variations will be apparent to persons of ordinary skill in the art in view of the present disclosure. Furthermore, other embodiments of rotatable objects 130 may use different constructions, such as a machined ball 132 to which a stem 136 is welded or threaded, a cast ball 132 having a threaded insert installed therein to receive a bolt, or a ball 132 formed by two shells with a bolt captured therebetween. In any case, the selection of suitable materials for the parts will be readily determined through routine experimentation.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for mounting an object within a vehicle, the system comprising:
    a housing having opposed ends;
    a pair of rotatable objects, each rotatable object at least partially received within a respective one of the opposed ends of the housing;
    a pair of locking elements positioned within the housing, each locking element movable within the housing between a locked position in which the locking element exerts a locking force against a respective rotatable object to resist rotation of the rotatable object relative to the housing, and an unlocked position in which the locking element does not exert the locking force against the respective rotatable object, and the rotatable object is free to rotate relative to the housing; and
    a handle extending from the housing, the handle being coupled to the pair of locking elements through a rigid linkage positioned at least partially within the housing, the handle pivotable between an extended position in which the handle moves the pair of locking elements via the rigid linkage to the unlocked position and a locked position in which the handle moves the pair of locking elements via the rigid linkage to the locked position,
    wherein the handle is pivotally connected to the housing at a handle pivot, and
    wherein the rigid linkage comprises:
        a drive link having a first end coupled to the handle at a first location offset from the handle pivot and a second end extending from the handle into the housing; and
        a pair of driven links coupled at respective first ends to the drive link and coupled at respective second ends to a respective one of the pair of locking elements.

2. The system of claim 1, wherein the pair of rotatable objects are a pair of balls, each ball having a mating structure extending therefrom, the respective mating structure of each ball configured to be attached to the vehicle or the object.

3. The system of claim 2, wherein each ball is formed from an elastomeric material overmolded over a portion of a stem that defines at least part of the mating structure, wherein the stem comprises at least one radially extending plate, wherein the elastomeric material forming the ball is overmolded over the at least one plate and the portion of the stem.

4. The system of claim 2, wherein each ball is formed from an elastomeric material overmolded over a portion of a stem that defines at least part of the mating structure, wherein at least one cross post extends through the portion of the stem, and the elastomeric material forming the ball is overmolded over the at least one cross post and the portion of the stem.

5. The system of claim 1, wherein each of the pair of locking elements comprises a respective sleeve that is configured to slide within a corresponding bore in the housing.

6. The system of claim 5, wherein each of the pair of locking elements comprises a partially spherical locking surface positioned to press against the respective rotatable object when the locking element is in the locked position.

7. The system of claim 6, wherein at least one of the partially spherical locking surface and a surface of the rotatable object comprises a compressible elastomeric material.

8. The system of claim 1, wherein the rigid linkage is configured such that movement of the handle from the extended position toward the locked position increases a force applied to the pair of rotatable objects by the pair of locking elements, and movement of the handle from the locked position toward the extended position decreases a force applied to the pair of rotatable objects by the pair of locking elements.

9. The system of claim 1, wherein:
    the drive link is rotatably connected to the handle at the first location by a first pivot;
    each of the pair of driven links is coupled at the respective first end to the second end of the drive link at a respective second pivot; and
    each of the pair of driven links is coupled at the respective second end to the respective one of the pair of locking elements at a respective third pivot.

10. The system of claim 9, wherein the respective lower drive link pivots are offset from each other.

11. The system of claim 9, wherein, when the handle is in the extended position, at least one of the respective second pivots is located on a first side of a drive axis defined by a straight line extending between the third pivots, and when the handle is in the locked position the at least one of the respective second pivots is located on a second side of the drive axis.

12. The system of claim 9, wherein, when the handle is in the extended position, the second pivots are located on a first side of a drive axis defined by a straight line extending between the third pivots, and when the handle is in the locked position the second pivots are located on a second side of the drive axis.

13. The system of claim 1, wherein the rigid linkage is movable to a self-retaining locked position.

14. The system of claim 1, wherein at least one of the pair of rotatable objects comprises a ball fixed to a stem, and a mating structure releasably secured to the stem.

15. The system of claim 1, wherein at least one of the pair of rotatable objects comprises a ball configured to be secured to a plurality of different mating structures.

16. A system for mounting an object within a vehicle, the system comprising:
- a housing having opposed ends;
- a pair of rotatable objects, each rotatable object at least partially received within a respective one of the opposed ends of the housing;
- a pair of locking elements positioned within the housing, each locking element movable within the housing between a locked position in which the locking element exerts a locking force against a respective rotatable object to resist rotation of the rotatable object relative to the housing, and an unlocked position in which the locking element does not exert the locking force against the respective rotatable object, and the rotatable object is free to rotate relative to the housing; and
- a handle extending from the housing, the handle being coupled to the pair of locking elements through a rigid linkage positioned at least partially within the housing, the handle pivotable between an extended position in which the handle moves the pair of locking elements via the rigid linkage to the unlocked position and a locked position in which the handle moves the pair of locking elements via the rigid linkage to the locked position,
- wherein the pair of rotatable objects are a pair of balls, each ball having a mating structure extending therefrom, the respective mating structure of each ball configured to be attached to the vehicle or the object, and
- wherein each ball is formed from an elastomeric material overmolded over a portion of a stem that defines at least part of the mating structure, wherein the portion of the stem comprises at least one recess, and the elastomeric material forming the ball is overmolded over the portion of the stem and extends into the at least one recess.

17. The system of claim 16, wherein the portion of the stem that defines at least part of the mating structure comprises a spherical cage having a plurality of cutouts.

18. A system for mounting an object within a vehicle, the system comprising:
- a housing having opposed ends;
- a pair of rotatable objects, each rotatable object at least partially received within a respective one of the opposed ends of the housing;
- a pair of locking elements positioned within the housing, each locking element movable within the housing between a locked position in which the locking element exerts a locking force against a respective rotatable object to resist rotation of the rotatable object relative to the housing, and an unlocked position in which the locking element does not exert the locking force against the respective rotatable object, and the rotatable object is free to rotate relative to the housing; and
- a handle extending from the housing, the handle being coupled to the pair of locking elements through a rigid linkage positioned at least partially within the housing, the handle pivotable between an extended position in which the handle moves the pair of locking elements via the rigid linkage to the unlocked position and a locked position in which the handle moves the pair of locking elements via the rigid linkage to the locked position,
- wherein each of the pair of locking elements comprises a respective sleeve that is configured to slide within a corresponding bore in the housing,
- wherein each of the pair of locking elements comprises a partially spherical locking surface positioned to press against the respective rotatable object when the locking element is in the locked position, and
- wherein each partially spherical locking surface comprises one or more ribs extending towards a respective rotatable object, or one or more grooves extending away from the respective rotatable object.

19. A system for mounting an object within a vehicle, the system comprising:
- a housing having opposed ends;
- a pair of rotatable objects, each rotatable object at least partially received within a respective one of the opposed ends of the housing;
- a pair of locking elements positioned within the housing, each locking element movable within the housing between a locked position in which the locking element exerts a locking force against a respective rotatable object to resist rotation of the rotatable object relative to the housing, and an unlocked position in which the locking element does not exert the locking force against the respective rotatable object, and the rotatable object is free to rotate relative to the housing; and
- a handle extending from the housing, the handle being coupled to the pair of locking elements through a rigid linkage positioned at least partially within the housing, the handle pivotable between an extended position in which the handle moves the pair of locking elements via the rigid linkage to the unlocked position and a locked position in which the handle moves the pair of locking elements via the rigid linkage to the locked position,
- wherein at least one of the pair of rotatable objects comprises a ball configured to be secured to a plurality of different mating structures, and
- wherein the ball is secured to a stem having a first connection interface, and each of the plurality of different mating structures comprises a respective second connection interface configured to mate with the first connection interface, and each of the plurality of different mating structures comprises a respective base extending from the respective second connection interface, with each respective base having a unique geometrical shape.

* * * * *